United States Patent [19]

Mone

[11] 4,079,026
[45] Mar. 14, 1978

[54] PRINTING INKS AND PROCESS FOR USING THE SAME

[75] Inventor: John Gregory Mone, Mendenhall, Pa.

[73] Assignee: Hercules Incorporated, Wilmington, Del.

[21] Appl. No.: 808,214

[22] Filed: Jun. 20, 1977

[51] Int. Cl.² ...................... C09D 11/08; C09D 11/10
[52] U.S. Cl. ............................... 260/22 CQ; 101/451; 106/20; 106/27; 106/30; 260/22 CB; 260/26; 260/DIG. 38
[58] Field of Search ..... 260/22 CQ, 22 CB, DIG. 38, 260/26; 106/20, 27, 30; 101/451

[56] References Cited

U.S. PATENT DOCUMENTS

| 3,412,104 | 11/1968 | McIntosh et al. | 260/21 |
| 3,455,856 | 7/1969 | Voedisch et al. | 260/22 R |
| 3,615,750 | 10/1971 | Blair | 106/27 |
| 3,850,649 | 11/1974 | Buerkley et al. | 106/27 |
| 3,948,827 | 4/1976 | Noshiro et al. | 260/22 CQ |
| 3,951,668 | 4/1976 | Schumacher et al. | 106/30 |
| 4,045,232 | 8/1977 | Parkinson | 260/22 R |

Primary Examiner—Ronald W. Griffin
Attorney, Agent, or Firm—Hazel L. Deming

[57] ABSTRACT

Printing inks and particularly fluorescent colored inks which provide outstanding color strength and dot resolution with planographic and letterpress printing processes are described. The inks comprise an intimate dispersion of colored resin particles in a vehicle containing specified amounts of certain alkyd resins, esters of modified rosin, carboxylated hydrocarbon resins and ink oil.

11 Claims, No Drawings

PRINTING INKS AND PROCESS FOR USING THE SAME

This invention relates to oleoresinous base printing inks and more particularly to printing inks containing a dispersed phase of colored resin particles in a continuous phase oleoresinous printing ink vehicle.

Oleoresinous base printing inks are formulated to provide optimum quality and performance for a given method of application from a resin, solvent and pigment. The resin and solvent components of the ink together serve as the vehicle for the pigment and the resin also serves the purpose of binding the pigment particles to the substrate such as paper, card stock or the like.

The pigments conventionally used in printing inks are the inorganic and organic pigments which wet well in the vehicle and are sufficiently water-insoluble that transfer from the oil phase does not occur during printing and there is no bleeding, tinting or discoloration in the non-printing area. As a class, the organic pigments possess cleaner color tones than the inorganic pigments but do not possess the clarity and brilliance of the fluorescent pigments. The fluorescent pigments, however, are completely different from all other forms of pigments in that they are the combination of a small amount of a fluorescent dye dissolved, dispersed or fixed in a large amount of a resin matrix. Hence the color strength of fluorescent pigments is relatively low as compared with conventional pigments and the use of fluorescent pigments in printing ink vehicles and usually been limited to speciality applications wherein a thick film of ink can be applied to large areas or overprinting can be used to increase the strength of the color.

One of the major problems associated with the use of fluorescent pigments to color oleoresinous base printing inks concerns the difficulty of achieving pigmentary sized resin particles in a uniform size. One method which has been proposed for improving the size and uniformity of fluorescent particles and hence the color strength of printing inks containing them is described by McIntosh et al in U.S. Pat. No. 3,412,104 and Voedisch et al in U.S. Pat. No. 3,455,856. In U.S. Pat. Nos. 3,412,104 and 3,455,856, patentees teach producing a dispersion of extremely fine colored resin particles in situ in a conventional printing ink vehicle containing a drying oil modified alkyd resin or a styrenated oil-modified alkyd resin and a high boiling saturated aliphatic hydrocarbon ink solvent. The printing inks formed in accordance with the McIntosh et al and Voedisch et al patents have improved quality and stability as compared with inks formed by directly grinding the colored resin particles into an ink vehicle. However, print quality is still not as good as that which can be achieved with conventional pigments and the search continues for printing inks in which the clarity and brilliance of the fluorescent pigments is optimized and print superiority is achieved.

Now, in accordance with the present invention, it has been found that the above objectives can be realized and outstanding strength and dot resolution achieved in planographic or letter-press processes on paper or plastic sheet using an oleoresinous base printing ink containing finely-divided colored resin particles intimately dispersed in a vehicle containing a mixture of three specific types of resins in an ink oil solvent. Accordingly, the invention relates to an oleoresinous base printing ink composition which provides with planographic or letterpress printing processes outstanding color strength and dot resolution, said composition comprising an intimate dispersion of at least a coloring amount of finely-divided colored resin particles in a continuous phase liquid film-forming vehicle which is a non-solvent for the colored resin particles and comprises by weight (1) 55 to 75% of a binder resin system consisting essentially of, by weight, (a) 15 to 30% of a drying oil modified alkyd resin having an acid number of 5 to about 20 and a Gardner-Holdt viscosity at 25° C. of Z4 to Z10, (b) 40 to 70% of an ester of modified rosin having a drop softening point range of 145° to 175° C. and a acid number of 5 to about 30, and (c) 15 to 30% of a low molecular weight, carboxylated hydrocarbon resin of petroleum origin having a Ring & Ball softening point of 110° to 180° C. and an acid number of 5 to about 20; and (2) 25 to 45% of an ink oil which is a solvent for the binder resin system and has a boiling point of at least about 200° C.

As indicated above, the printing ink of this invention contains as the binder resin system specified proportions of three different types of resins, one of which is of the alkyd type, another of which is an ester of modified rosin and the third of which is a carboxylated petroleum type resin. The alkyd resin component comprises 15 to 30% of the binder system and is a drying oil modified alkyd resin having an acid number of 5 to about 20 and a Gardner-Holt viscosity at 25° C. of Z4 to Z10. Alkyd resins of this type are well known and are conventionally prepared by the coreaction of a polyhydric alcohol such as glycerol or pentaerythritol and a polycarboxylic acid or anhydride such as the phthalic acids, phthalic anhydride, maleic anhydride and the like with a drying oil such as linseed oil, soya oil, and the like at elevated temperature unitl esterfication is substantially complete and the desired acid number and viscosity are obtained. It is desirable to use a sufficient amount of oil in modifying the alkyd resin so that the modified alkyd resin will have an oil length in the medium to long category, and preferably an oil content of 60 to 85% based on the resin solids.

The esters of modified rosin which comprise the second component of the binder resin system constitute 40 to 70% of the binder, have a drop softening point range of 145° to 175° C. and have an acid number of about 5 to about 30. The esters of modified rosin which have the above properites are preferably pentaerythritol or glycol esters of modified rosin or dimeric rosin acids. The ester type resins are commercially available as the Lewisol and Pentalyn resins of Hercules Incorporated.

The carboxylated hydrocarbon type resins make up 15 to 30% of the binder resin systems and are non-crystalline, friable, low molecular weight thermoplastic resins of petroleum origin. The useful resins have a Ring and Ball softening point of from 110° to 180° C. and an acid number of 5 to about 20. The preferred resins having the above properties are the maleic modified petroleum resins obtained by the catalytic polymerization of a mixture of monomers derived from the deep cracking of petroleum, which monomers are chiefly mono- and diolefins and preferably in the $C_9$ to $C_{11}$ range.

The three resin components make up the film-forming or binder portion of the ink vehicle and together with the oil solvent provide a continuous phase liquid film-forming vehicle in which the colored resin particles are intimately dispersed. The ink oil must, of course, be a solvent for the binder system and a non-solvent for the colored resin particles and must be present in an amount to provide a continuous liquid phase with the binder system. For optimum results, it has been found that the ink oil should constitute 25 to 45% of the vehicles. Ink oils which are preferred are the high boiling petroleum hydrocarbon fractions having a minimum boiling point of at least about 200° C. and preferably a boiling range from about 225° to about 280° C. and a Kauri-butanol value of about 24 to about 29. Most preferred are the ink oils commercially known as the Magie oils made by Magie Bros. Oil Company, and particularly No. 470, No. 535 and No. 589 oil.

The pigments which are used in the present invention are particles of an organic resin colored with a dyestuff which can be fluorescent or non-fluorescent. A variety of resins are known to provide suitable matrices for dyes. For example, the resins formed by the reaction of a polybasic acid and a polyhydric alcohol or the condensation products of urea or melamine with formaldehyde provide infusible and insoluble colorants which can be ground to pigment size particles. Also suitable are the modified sulfonamide resins formed by the co-condensation of an aminotriazine, formaldehyde and an aryl-monosulfonamide and the resinous precondensates derived from polyfunctional acids and alcohols and preferably from phthalic anhydride or its esters and pentaerythritol or tris-(2-hydroxyethyl)isocyanurate. Also useful are the cross-linked polyester resins derived from polycarboxylic acids or their anhydrides and polyfunctional alcohols and cross-linked with polyfunctional isocyanates or cyclic-dior tetracarboxylic acid anhydrides. The amount of dye added to the resin should be a coloring amount and will usually range from about 0.02% to about 25% by weight of the resin. Any dye or dye combination which imparts color to the resin can be used. Particularly preferred are the daylight fluorescent-type dyes which belong to the dye families known as rhodamines, fluoresceins, coumarins, naphthalimides, benzoxanthrenes and acridines, and the non-fluorescent dyes, particularly those which are known as acid and basic dyes.

The amount of colored resin particles dispersed in the vehicle should be at least a coloring amount, and usually will range from about 10% to about 70% and preferably from about 25% to about 60% of the ink. Other pigments, as desired, to create specific visual effects can also be present.

Conventional additives such as dispersing agents, surfactants, emulsifying agents, gelling agents, antioxidants, optical brighteners, ultraviolet inhibitors, driers and the like can also be present in the ink, as desired. Usually, a gelling agent such as, for example, an aluminum or titanium compound, and preferably a chelated aluminum compound, will be included in an amount ranging from about 0.2 to about 4.0% of the vehicle to improve the viscosity. Likewise, the inclusion of an emulsifying agent of the surfactant type such as, for example, an anionic surfactant, and preferably the salts such as the sodium salt of a polycarboxylic acid or sulfonic acid will improve printing. If present, the emulsifying agent will preferably range from about 0.5 to 10% by weight of the vehicle.

The links of the present invention can be produced by blending the resin components and the ink oil in a suitable mixer until a uniform vehicle is obtained, adding the colored resin particles to the vehicle, and continuing blending, preferably on a three-roll mill, until a uniform dispersion is obtained. Alternatively, the colored resin particles can be synthesized in situ in the vehicle by adding the selected resin-forming ingredients and the dye to the heated vehicle and heating the mixture under agitation until polymerization of the resin-forming ingredients occurs and the resin cures in a finely-dispersed condition. Formation of the colored dispersed phase resin particles in situ in the ink vehicle has the advantage of providing smaller and more uniformly sized particles than can be obtained by separate syntheses and grinding and hence is preferred.

The inks of this invention can be used as such or, if desired, let down or diluted with additional vehicle and/or ink oil. The inclusion of up to about 30% and preferably from about 2 to about 20% of such additives as driers, anti-skimming compounds, waxes, stearates, varnishes and the like is usually preferred to obtain the desired viscosity and other properties for ink use.

The invention is further illustrated by reference to the following example wherein all parts and percentages are by weight unless otherwise indicated.

EXAMPLE

A vehicle was prepared as follows. A vessel was charged with 100 parts of a pentaerythritol phthalate linseed modified alkyd (100% solids) having a linseed oil content of 65%, an acid number of about 10 and a Gardner Holdt viscosity of Z7 at 25° C. 160 parts of a pentaerythritol ester of modified rosin having a drop softening point of 159° C. (Hercules method), an acid number of 5 and a Brookfield viscosity at 50% solids in Magie 470 oil at 25° C. of 100 poises; 100 parts of a maleic anhydride modified friable hydrocarbon resin derived from petroleum sources and having a ball and ring softening point of about 150° C., an acid number of 5 to 10 and a molecular weight of about 1000; and 40 parts of Magie No. 470 oil and the charge was heated to 180° to 185° C. with stirring. When the charge became fluid, an additional 80 parts of the Magie oil, 12.5 parts of an anionic surfactant and 7.5 parts of a 33% dispersion of chelated aluminum isopropylate in Magie 470 oil were added and the mixture was maintained at 180°–185° C. until the ingredients completely dissolved and a clear solution was obtained.

A portion of the above vehicle equal to 232 parts and 42 parts of Magie No. 589 oil were charged to a reaction kettle equipped with external heating means and the charge was slowly heated with slow speed agitation to 85° C., at which time 133 parts of ortho-para-toluene sulfonamide and 36.8 parts of powdered melamine were added over a period of about 2 minutes. Agitation speed was increased to the maximum and 133 parts of a 37% aqueous solution of formaldehyde were added. The addition resulted in a cooling of the mixture to about 75° C. Heating and mixing at high speed were continued to bring the temperature back to 85° C., a yellow fluorescent dye mixture of 55 parts of Fluorescent yellow FGPN, 10 parts of Calcozine yellow SFW and 0.05 part of Rhodamine 6GDN was added and heating and mixing at high speed were continued until the temperature reached 125° C. Next, 0.1 part of a phenolic antioxidant was added and heating and mixing were continued to 135° C., at which temperature the heating was terminated and the resulting yellow ink base was cooled rapidly to 93° C. The warm ink base was then filtered through an 80 mesh screen into a vessel and cooled to ambient temperature. The yellow ink base contained about 50.9% by weight of the base of finely-divided yellow colored resin particles intimately dispersed in the vehicle.

The above procedure was repeated using a second portion (232 parts) of the vehicle with the exceptions that 147.5 parts of ortho-para-toluene sulfonamide, 30.5 parts of powdered melamine and 111 parts of aqueous formaldehyde were used and a magenta fluorescent dye mixture of 45 parts of Rhodamine 6GDN and 11 parts of Rhodamine F3B was substituted for the yellow dye mixture. The magenta ink base contained about 50.1% by weight of the base of finely-divided magenta colored resin particles intimately dispersed in the vehicle.

Each of the above yellow and magenta ink bases was used to form a lithographic printing ink by thoroughly mixing 86 parts of the ink base with 6 parts of a gloss varnish containing at 50:50 mixture of a urethane varnish and a linseed oil/phenolic resin varnish, 2 parts of Magie No. 535 oil, 1 part of drier and 5 parts of polyethylene wax. The above inks along with a commercial blue and black lithographic ink (Syn-Glo Process Blue No. 52120 containing copper phthalocyanine blue pigment, and Syn-Glo Process Black No. 52121 containing carbon black, manufactured by Keystone Printing Ink Co., Philadelphia, Pa.) were used in the 4 color printing of seascapes, flowers, still lifes and portraits on various weights of uncoated and coated paper stock and polypropylene sheet (Kimdura manufactured by Kimberly-Clark Corp.) using a 23 × 36 inch TPF Miller 2 color perfector offset lithographic press. The paper stocks used were: 80 pound Logan Vellum (flat); 80 pound Master Mark (coated); 80 pound Clearform Silk (coated); and 9 point Carolina Tag (coated cover stock). The printed designs in all cases were clean and bright, possessed a dimensional effect brought about by the high contrast of the fluorescent portions against the blue and black portions and had much higher dot resolution and tint strength than is characteristic of normal fluorescent inks.

For the sake of comparison the designs were also printed in 4 colors as above except that the yellow and magenta inks employed were commercial process inks containing conventional magenta and yellow pigments. The inks employed in this comparison were Syn-Glo Process Yellow No. 52118 containing a diarylide yellow pigment and Syn-Glo Process magenta No. 52119 containing a molybdated rhodamine pigment (Keystone Printing Ink Co., Philadelphia, Pa.). When the two sets of prints were compared, the prints obtained using the inks of this example provided an overall cleaner print quality, high-lighted natural color tones, higher contrast and brighter and more vivid yellows, golds, oranges and reds than the comparison. In both cases, dot resolution was good and about equal, denoting that the fluorescent inks performed as well as conventionally pigmented inks, a result heretofore not known to be achievable.

I claim:

1. An oleoresinous base printing ink composition which provides with planographic or letterpress printing processes outstanding color strength and dot resolution, said composition comprising an intimate dispersion of at least a coloring amount of finely-divided colored resin particles in a continuous phase liquid film-forming vehicle which is a non-solvent for the colored resin particles and comprises by weight
   1. 55 to 75% of a binder resin system consisting essentially of, by weight,
      a. 15 to 30% of a drying oil modified alkyd resin having an acid number of 5 to about 20 and a Gardner-Holdt viscosity at 25° C. of Z4 to Z10,
      b. 40 to 70% of an ester of modified rosin having a drop softening point range of 145° to 175° C. and an acid number of 5 to about 30, and
      c. 15 to 30% of a low molecular weight, carboxylated hydrocarbon resin of petroleum origin having a Ring and Ball softening point of 110° to 180° C. and an acid number of 5 to about 20; and
   2. 25 to 45% of an ink oil which is a solvent for the binder resin system and has a boiling point of at least about 200° C.

2. The composition of claim 1 wherein the vehicle also contains 0.5 to 10% of an emulsifying agent and 0.2 to 4% of a gelling agent.

3. The composition of claim 2 wherein the resin particles are fluorescent colored.

4. The composition of claim 3 wherein the particles are of a modified sulfonamide resin.

5. The composition of claim 4 wherein the amount of fluorescent colored resin particles ranges from about 10 to about 70% by weight of the composition.

6. The composition of claim 4 containing from 2 to 20% by weight of the composition of ink additives selected from oils, ink vehicles, ink solvents, driers, waxes and mixtures thereof.

7. The composition of claim 6 wherein the amount of fluorescent colored resin particles ranges from about 25 to about 60% by weight of the composition.

8. In a process of printing using planographic or letter-press plates on single or multicolor presses, the improvement which comprises contacting the printing area of said plates with the composition of claim 7 to form an inked print and transferring the inked print to a substrate.

9. A process of printing by the offset technique using a single or multicolor press comprising the steps of treating a plate to provide printing and non-printing areas, applying an aqueous solution to the non-printing area of said plate, applying the composition of claim 7 to the printing area of said plate to form an inked print and transferring the inked print to a substrate.

10. The process of claim 9 wherein the substrate is paper stock or polypropylene sheet.

11. The process of claim 10 wherein the steps are repeated a multiplicity of times using different colored compositions of claim 7.

* * * * *